No. 62,960. PATENTED MAR. 19, 1867.
W. JANNEY.
APPARATUS FOR COOKING AND PRESERVING FRUITS.
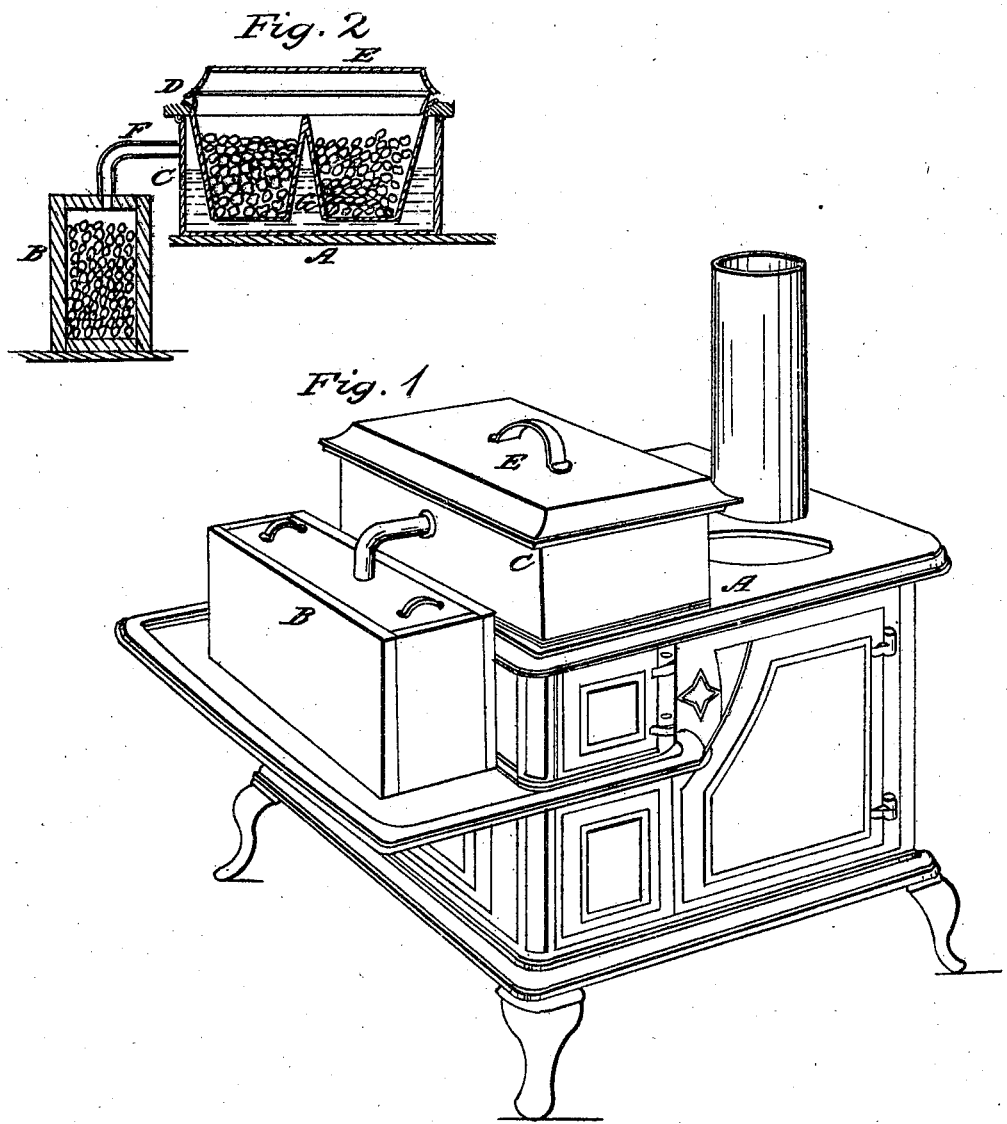

United States Patent Office.

WILLIAM JANNEY, OF MARTINSVILLE, OHIO.

Letters Patent No. 62,960, dated March 19, 1867.

IMPROVED APPARATUS FOR COOKING AND PRESERVING FRUITS.

The Schedule referred to in these Letters Patent and making part of the same.

TO ALL WHOM IT MAY CONCERN:

Be it known that I, WILLIAM JANNEY, of Martinsville, Clinton county, and State of Ohio, have invented a new and useful improvement in Fruit Pans, of which the following is a full and clear description reference being had to the accompanying drawings, making part of this specification.

My invention relates to a new device to prepare fruit for canning purposes by steaming it, in connection with a common cook stove, avoiding breaking, scorching, or destroying the flavor.

Figure 1 represents in perspective a stove with my improvement upon it.

Figure 2 is a transverse sectional view of my improved fruit pans.

A is the stove, upon which, in place, is the steam chest B constructed of wood. C is a vessel to receive the fruit pan D, which has the cover E. F is a pipe to convey steam from vessel C to steam chest B. The steam chest B is made of wood, and is placed upon the stove, or at any convenient place near the stove, for the purpose of receiving the fruit cans to be steamed previous to the fruit being placed in them. At the same time the fruit is introduced into fruit pan D, which is divided into two compartments, the open partition G separating them, and permitting the water in the vessel C to freely circulate about as well as beneath the (double) fruit pan D. The water in the vessel C does not rise to the top so as to fill it when the fruit pan D is in place and filled with fruit, but only so far as to leave room for the accumulation of a large bulk of steam. From near the top of vessel C proceeds the steam pipe F. The fruit in the pan D is gradually heated throughout the mass without removing cover E, or in any way disturbing the contents, usually done by stirring, until the time arrives for canning. The cans having been in the mean time heating, they are filled from the fruit pan D, care being taken to prepare only such a quantity of fruit as will fill the cans; the cans are then sealed. By the above process the fruit retains its plump form and flavor to a much greater extent than by the usual mode of putting up canned fruit.

Having fully described my improved fruit pan, the uses of its various parts, and advantages over those now in use, I make the following claims, which I desire to secure by Letters Patent:

1. The fruit pan D in combination with vessel C, as above described, and for the purpose set forth.

2. The steam chest B, pipe F, and vessel C, in combination with fruit pan D, for the purposes above specified.

WILLIAM JANNEY.